(12) United States Patent
Blaney et al.

(10) Patent No.: US 11,215,119 B2
(45) Date of Patent: ***Jan. 4, 2022

(54) CMC BOAS COOLING AIR FLOW GUIDE

(71) Applicant: RAYTHEON TECHNOLOGIES CORPORATION, Farmington, CT (US)

(72) Inventors: Ken F. Blaney, Middleton, NH (US); Thomas E. Clark, Sanford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/814,159

(22) Filed: Mar. 10, 2020

(65) Prior Publication Data
US 2020/0378306 A1 Dec. 3, 2020

Related U.S. Application Data

(63) Continuation of application No. 16/122,431, filed on Sep. 5, 2018, now Pat. No. 10,648,407.

(51) Int. Cl.
*F02C 7/18* (2006.01)
*F02C 3/04* (2006.01)
*F02C 9/16* (2006.01)

(52) U.S. Cl.
CPC ............... *F02C 7/18* (2013.01); *F02C 3/04* (2013.01); *F02C 9/16* (2013.01); *F05D 2220/32* (2013.01); *F05D 2260/20* (2013.01)

(58) Field of Classification Search
None
See application file for complete search history.

(56) References Cited

U.S. PATENT DOCUMENTS

| 8,246,299 | B2 | 8/2012 | Razzell et al. |
| 8,784,037 | B2 | 7/2014 | Durocher et al. |
| 9,850,775 | B2 | 12/2017 | Pietrobon et al. |
| 10,648,407 | B2 * | 5/2020 | Blaney ............ F02C 9/16 |
| 2004/0047725 | A1 | 3/2004 | Tomita |
| 2011/0255989 | A1 | 10/2011 | Koyabu |
| 2018/0023408 | A1 | 1/2018 | Rice et al. |

FOREIGN PATENT DOCUMENTS

| EP | 1965030 | 9/2008 |
| EP | 2479385 | 7/2012 |

OTHER PUBLICATIONS

EP Search Report for EP Application No. 19195664.8 dated Feb. 3, 2020.

* cited by examiner

*Primary Examiner* — Michael Lebentritt
(74) *Attorney, Agent, or Firm* — Carlson, Gaskey & Olds, P.C.

(57) ABSTRACT

A blade outer air seal assembly includes a support structure arranged about an axis. At least one blade outer air seal segment is mounted in the support structure. A flow guide is arranged between the support structure and the at least one blade outer air seal segment defining a passage between the flow guide and the blade outer air seal segment. The passage extends in a generally axial direction.

20 Claims, 6 Drawing Sheets

CMC BOAS COOLING AIR FLOW GUIDE

CROSS-REFERENCE TO RELATED APPLICATIONS

This application is a continuation of U.S. patent application Ser. No. 16/122,431 filed Sep. 5, 2018, which is incorporated herein by reference.

BACKGROUND

This application relates to a cooling air flow guide for a blade outer air seal.

Gas turbine engines are known and typically include a compressor for compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

SUMMARY

In one exemplary embodiment, a turbine section for a gas turbine engine includes a turbine blade that extends radially outwardly to a radially outer tip and for rotation about an axis of rotation. A blade outer air seal is mounted in a support structure and is arranged radially outward of the outer tip. A flow guide is arranged between the support structure and the blade outer air seal and defines a passage between the flow guide and the blade outer air seal. The passage is configured to communicate air in a generally axial direction.

In a further embodiment of any of the above, the blade outer air seal has a hook near a first axial side and a lip near a second axial side for engagement with the support structure. The flow guide has a flow guide hook and flow guide lip that engage with the blade outer air seal.

In a further embodiment of any of the above, the flow guide hook is a radially outermost portion of the flow guide.

In a further embodiment of any of the above, the blade outer air seal has an air inlet in the hook. The flow guide has an air outlet near the second axial side of the blade outer air seal.

In a further embodiment of any of the above, the air inlet is configured to communicate cooling air radially inward to the passage.

In a further embodiment of any of the above, the air outlet is configured to communicate air to a chamber between the support structure and the blade outer air seal.

In a further embodiment of any of the above, a spacer is positioned between the flow guide and the blade outer air seal to maintain a gap between the flow guide and the blade outer air seal.

In a further embodiment of any of the above, the spacer is sized to force convection cooling on a radially outer surface of the blade outer air seal.

In a further embodiment of any of the above, the spacer is integrated with the flow guide.

In a further embodiment of any of the above, the spacer includes an inlet passage configured to communicate air radially inward to the passage.

In a further embodiment of any of the above, the blade outer air seal includes an inlet circumferentially aligned with the inlet passage.

In a further embodiment of any of the above, the flow guide has a blade out protection feature that extends radially outward from the flow guide.

In a further embodiment of any of the above, the structure has a cooling air port that is configured to communicate the air from the passage to a turbine vane aft of the blade.

In a further embodiment of any of the above, the flow guide has a plurality of segments that extend circumferentially about the axis.

In a further embodiment of any of the above, the blade outer air seal has a plurality of seal segments that extend circumferentially about the axis. The flow guide segments are offset from the seal segments.

In a further embodiment of any of the above, the blade outer air seal has a plurality of seal segments. There are the same number of flow guide segments and seal segments.

In a further embodiment of any of the above, the flow guide has a uniform thickness.

In a further embodiment of any of the above, the blade outer air seal is a ceramic matrix composite material.

In a further embodiment of any of the above, the flow guide is a cobalt alloy.

In a further embodiment of any of the above, the flow guide is formed from sheet metal.

In a further embodiment of any of the above, the blade outer air seal is a monolithic ceramic.

In a further embodiment of any of the above, the blade outer air seal and the flow guide are formed of different materials.

These and other features may be best understood from the following drawings and specification.

DETAILED DESCRIPTION

Figure 1:
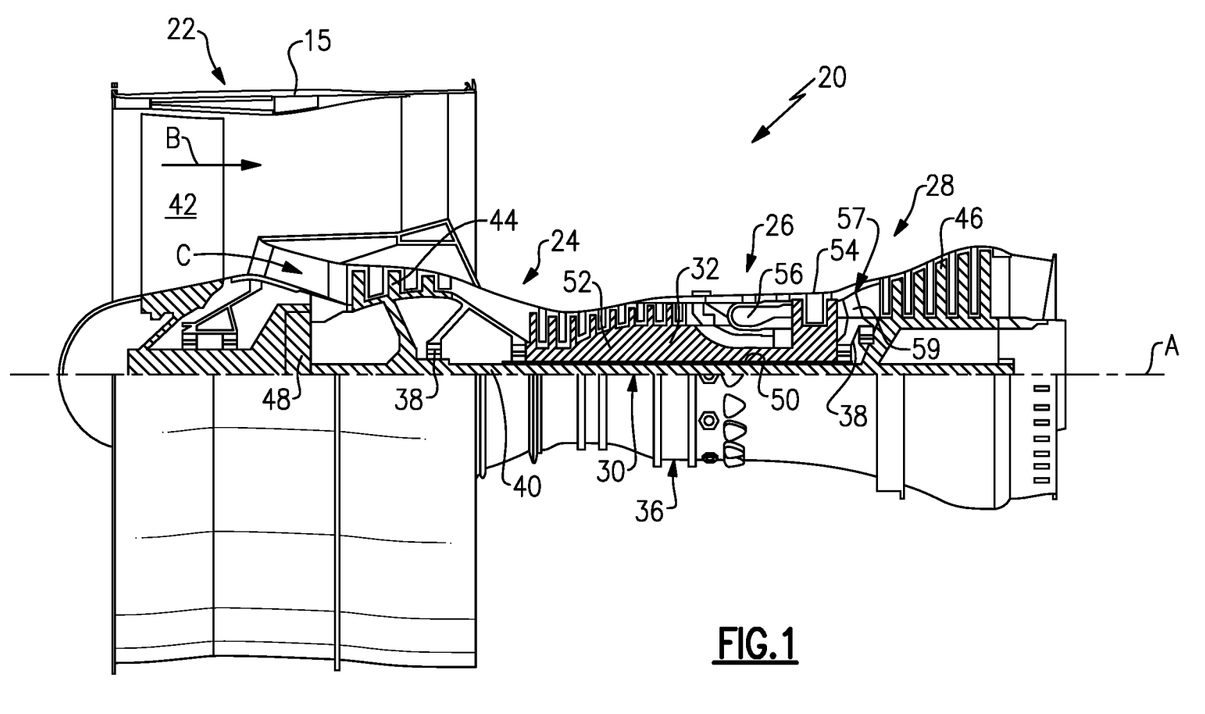
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° \ R)]^{0.5}$. The "Low corrected fan tip speed" as disclosed herein according to one non-limiting embodiment is less than about 1150 ft/second (350.5 meters/second).

Figure 2:
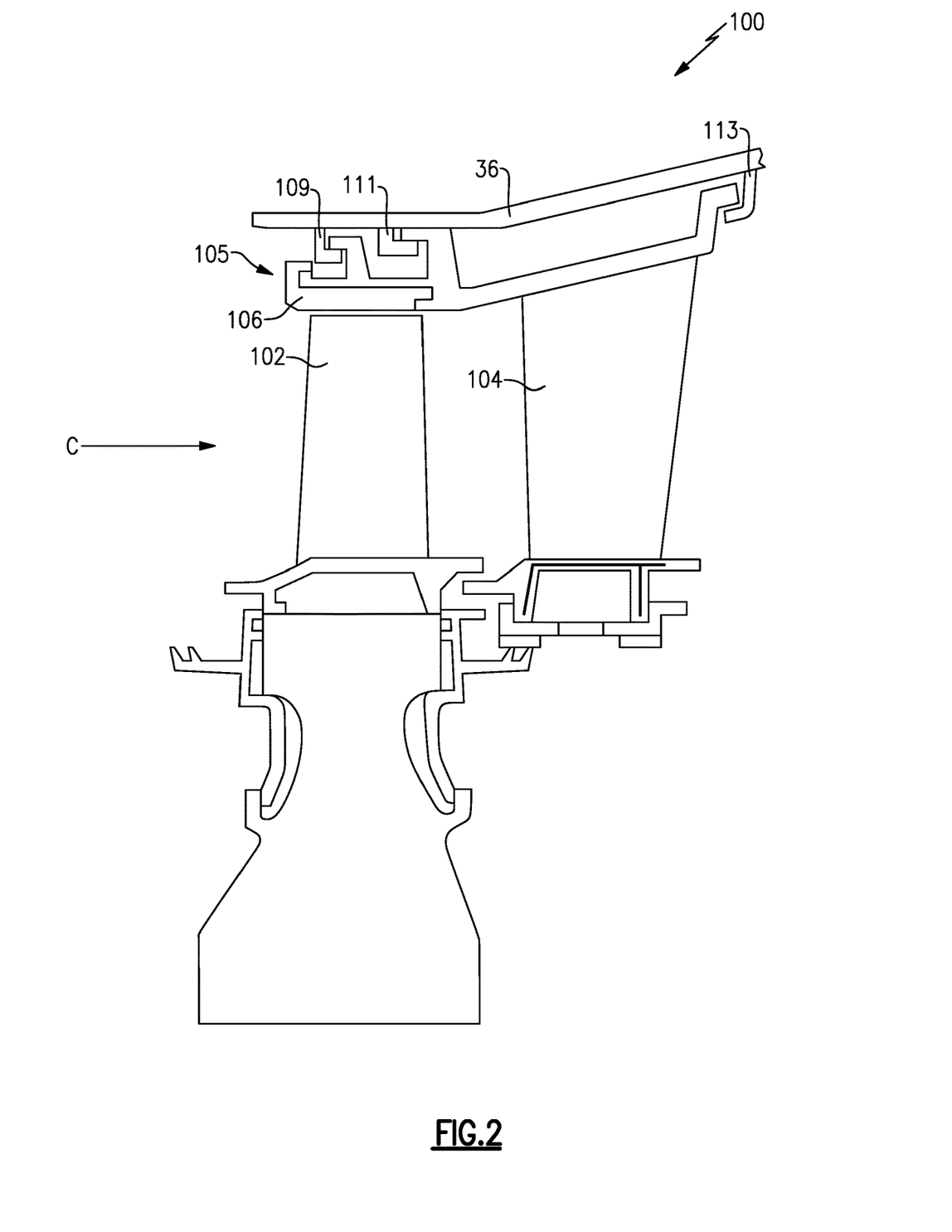
FIG. 2 schematically shows a portion of a turbine section.

FIG. 2 schematically illustrates a portion 100 of the turbine section 28. The portion 100 includes alternating series of rotating blades 102 and stationary vanes 104 that extend into the core flow path C of the gas turbine engine. Turbine blades 102 rotate and extract energy from the hot combustion gases that are communicated along the core flow path C of the gas turbine engine 20. The turbine vanes 104, which generally do not rotate, guide the airflow and prepare it for the next set of blades 102. As is known, it is desirable to pass the bulk of products of combustion downstream of the combustor section 26 across the turbine blades. Thus, an assembly 105 having a blade outer air seal ("BOAS") 106 is positioned slightly radially outwardly of the outer tip of the blades 102. It should be understood that the turbine section portion 100 could be utilized in other gas turbine engines, and even gas turbine engines not having a fan section at all.

The BOAS assembly 105 is attached to the engine static structure 36. The engine static structure 36 has a plurality of engagement features 109, 111, 113 for engagement with the BOAS assembly 105. In an embodiment, engagement features 109 and 111 are at an axial position between leading and trailing edges of the blade 102 and engagement feature 113 is aft of the vane 104. In another embodiment, engagement feature 111 is between the blade 102 and vane 104. Fewer or additional engagement features may be contemplated within the scope of this disclosure.

Figure 3:
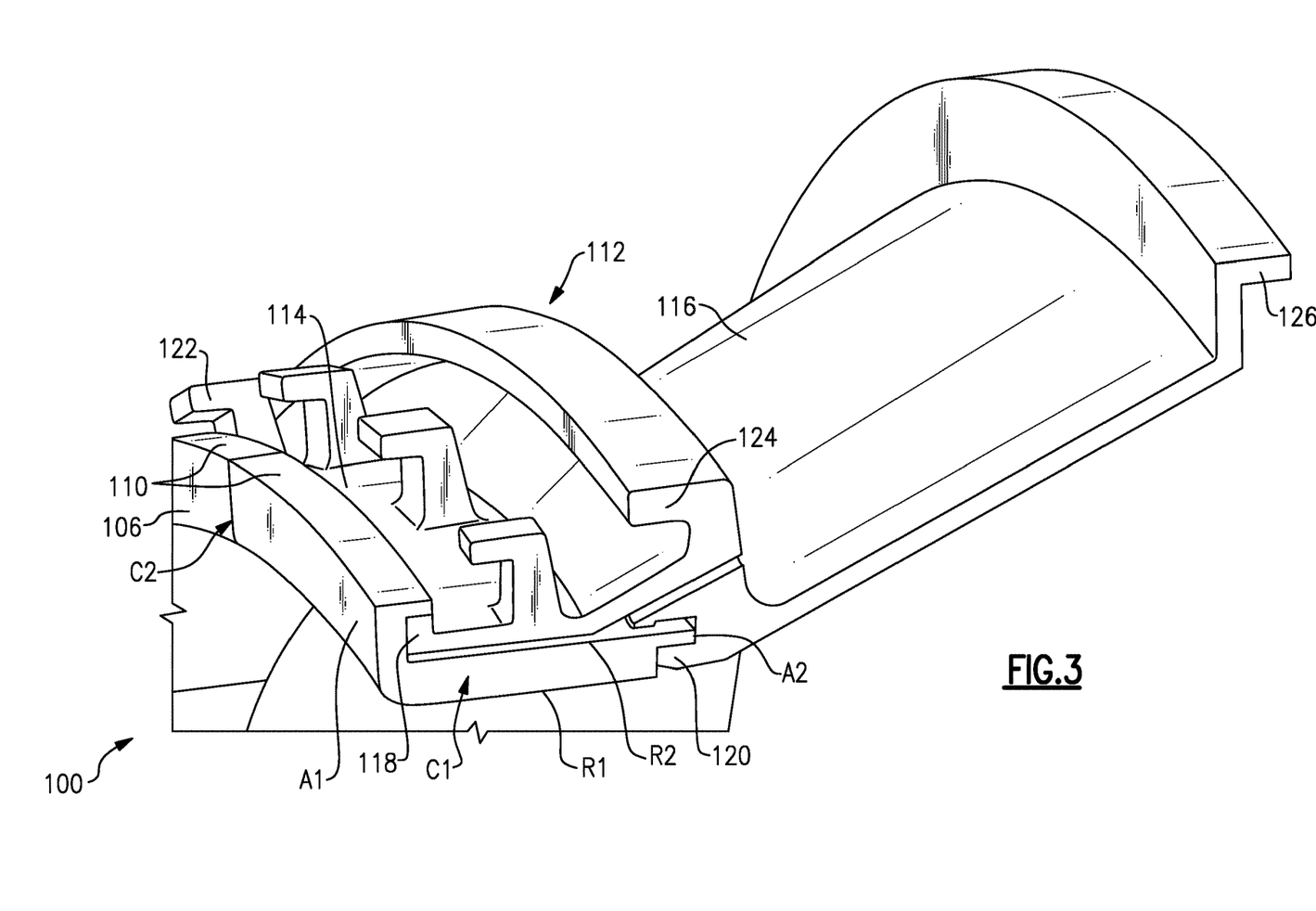
FIG. 3 shows a blade outer air seal and support structure.

FIG. 3 illustrates the BOAS assembly 105. The assembly 105 includes the BOAS 106, which is made up of a plurality of seal segments 110 that are circumferentially arranged in an annulus around the central axis A of the engine 20. The seal segments 110 are mounted in a structure 112, which is circumferentially continuous about the central axis A. The BOAS 106 is in close radial proximity to the tips of the blades 102 to reduce the amount of gas flow that escapes around the blades 102.

The seal segments 110 may be monolithic bodies that are formed of a high thermal-resistance, low-toughness material, such as a ceramic matrix composite. In another embodiment, the seal segments 110 may be formed from another material, such as monolithic ceramic or a metallic alloy. BOAS seals 106 that are ceramic matrix composite, particularly 2D ply construction, may be difficult to mount in an engine. This disclosure may also apply to 3D and 4D ceramic matrix composite construction methods. The parts of the assembly 105 are designed so that the thermal expansion in the axial direction can more easily work with other parts with different thermal expansion rations.

Each seal segment 110 is a body that defines radially inner and outer sides R1, R2, respectively, first and second circumferential ends C1, C2, respectively, and first and second axial sides A1, A2, respectively. The radially inner side R1 faces in a direction toward the engine central axis A. The radially inner side R1 is thus the gas path side of the seal segment 110 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

The seal segments 110 are mounted in the structure 112, which may include a BOAS support portion 114 and a vane platform portion 116. The BOAS support portion 114 includes a first support member 118 that radially supports a hook 130 on the seal segment 110 at an axially forward portion of the structure 114 and a second support member 120 that radially supports a lip 132 on the seal segment 110 at an axially aft portion of the seal segment 110. The first support member 118 is the axially forward-most end of the structure 112. In an embodiment, the second support member 120 is the radially innermost portion of the structure 112.

The structure 112 may include a plurality of hooks for attachment to the engine static structure 36. For example, the structure 112 may include a plurality of discrete hooks 122 extending radially outward from the BOAS support portion 114. The hooks 122 engage the engagement feature 109 (shown in FIG. 2). The structure 112 may include a continuous hook structure aft of the BOAS 106. In the illustrated embodiment, an attachment member 124 extends radially outward from the structure 112 for attachment to the engine 20. The attachment member 124 may be at the same axially position as the second support member 120, or may forward or aft of the second support member 120. The attachment member 124 engages the engagement feature 111 (shown in FIG. 2). The hooks 122 and attachment member 124 either both face forward or both face aft. A vane platform attachment member 126 extends radially outward from the vane platform portion 116. The attachment member 126 may face forward or aft.

In the illustrated embodiment, the vane platform attachment member 126 is axially aft of the vane 104. The vane platform attachment member 126 may be the radially outermost portion of the structure 112. The attachment member 126 engages the engagement feature 113 (shown in FIG. 2). Each of the attachment members 122, 124, 126 has a generally radially extending portion and a generally axially extending portion. Although three attachment members 122, 124, 126 and three engagement members 109, 111, 113 are shown, more or fewer may come within the scope of this disclosure.

In this embodiment, the BOAS support portion 114 and vane platform portion 116 form a unified part. The metallic vane platform portion 116 may be used in conjunction with a CMC vane 104, so that the vane construction is multi-piece in nature. The BOAS support portion 114 is joined with the vane platform portion 116 to allow the architecture to seal more easily and use cooling air more efficiently. This architecture allows BOAS cooling air reuse so the cooling air can be used on an adjacent vane 104. Details of a support structure 112 are found in copending U.S. patent application Ser. No. 16/122,373, entitled "UNIFIED BOAS SUPPORT AND VANE PLATFORM" filed on even date herewith. Although a unified BOAS support portion 114 and vane platform portion 116 is illustrated, the disclosed assembly may be used in a BOAS support that is not integrated with a vane platform.

Figure 4:
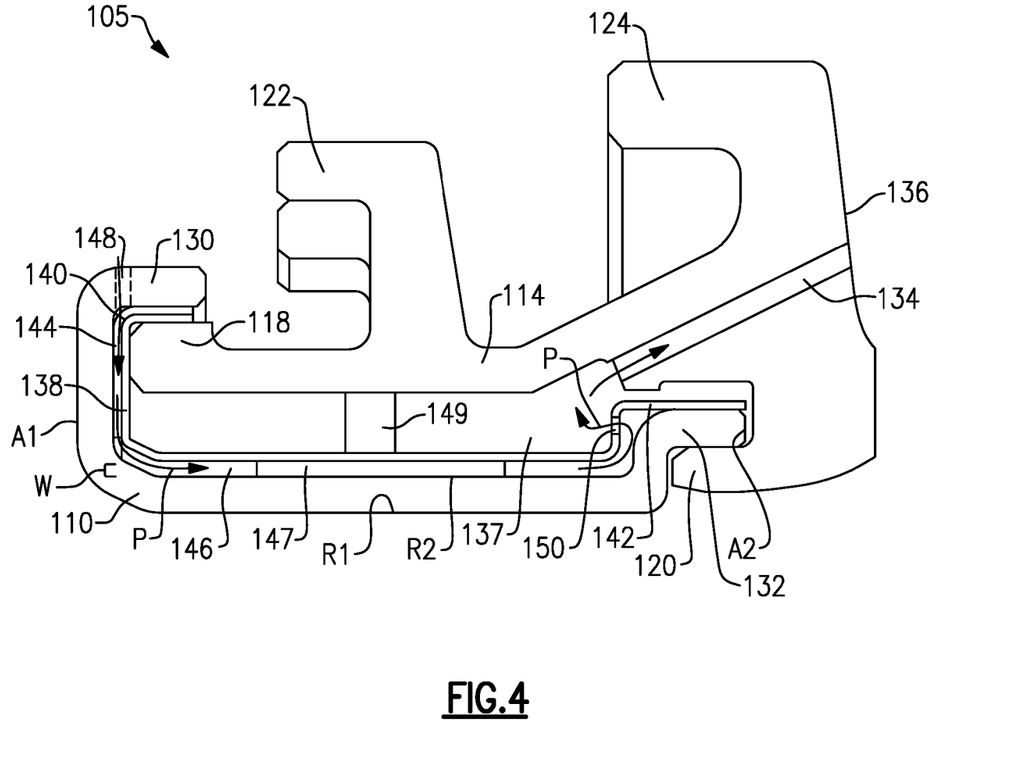
FIG. 4 shows a cross-sectional view through a blade outer air seal and support.

FIG. 4 shows a cross-section of the blade outer air seal assembly 105. A hook 130 is formed in seal segment 110 of the BOAS 106 near the first axial side A1 for engagement with the first support member 118. The hook 130 is at a forward-most portion of the seal segment 110. The hook 130 includes a radially outwardly extending portion defining the first axial side A1 and an axially extending portion that extends aft of the first axial side A1. A lip 132 is formed in the seal segment 110 near the second axial side A2 for engagement with the second support member 120. The lip 132 extends generally axially from the seal segment 110. The BOAS may be assembled in a forward to aft direction, as the hook 130 and lip 132 will be received in the first and second support members 118, 120, respectively.

A cooling air reuse port 134 extends between a vane chamber 136 and a BOAS chamber 137. The vane chamber 136 is formed between the vane platform portion 116 and an engine structure, such as the engine static structure 36 (shown in FIG. 1). The BOAS chamber 137 is formed between the BOAS support portion 114 and the BOAS 106. Cooling air enters the BOAS chamber 137 through an inlet 148 in the BOAS 106, and may be reused to cool the vane 104 by travelling through the cooling air port 134. The port 134 extends through a wall formed by attachment member 124. In one embodiment, the port 134 extends generally axially. In another embodiment, the port 134 may be a different orientation, such as generally radially, depending on the orientation of the hooks 122 and attachment member 124. For example, the port 134 may extend generally perpendicular to the axis A. The support structure 112 may include a plurality of cooling air reuse ports 134 spaced circumferentially about the support structure 112.

The port 134 re-uses cooling air that has been used for forced convection back side cooling of the BOAS 106 to cool an adjacent vane 104. The used air can then be used to cool the adjacent vane 104, reducing the amount of cooling air required to be supplied by the compressor section 24, which may improve engine cycle efficiency. In some examples, cooling air from several BOAS 106 may be reused to cool a single vane 104.

A flow guide 138 is arranged between the BOAS 106 and BOAS support portion 114. The flow guide 138 generally tracks the shape of the BOAS 106. The flow guide 138 has a hook 140 and lip 142 that generally correspond to a hook 130 and lip 132 on the BOAS 106, respectively. The flow guide 138 has a radial portion that is parallel to the axial side A1 of the BOAS 106 at an axially forward-most part of the flow guide 138. The hook 140 is the radially outermost portion of the flow guide 138. In an embodiment, the hook 140 extends axially aft from a radial portion. The lip 142 is at an aft part of the flow guide 138 and extends radially aft of the support member 120. In an embodiment, the lip 142 extends to a common axial position as the second axial side A2 of the BOAS 106.

The flow guide 138 forces convection along the radial surface R2 of the BOAS 106. A spacer 144 may be arranged between the flow guide 138 and the BOAS 106. A gap 146 is formed between the BOAS 106 and flow guide 138 having a width w, which is defined and maintained by the spacer 144. Cooling air enters the BOAS 106 through a BOAS inlet 148, then travels radially inward through the spacer 144 into the gap 146. Cooling air exits the gap 146 through an outlet 150 in the flow guide 138, and through the port 134. The flow guide 138 thus defines a cooling passage P from the BOAS inlet 148, along the gap 146, through the flow guide outlet 150, and out the port 134.

The flow guide 138 may be segmented or may be a full ring. The flow guide 138 may have features stamped, coined or machined into it to help optimize the distribution of cooling air. In some applications, the flow guide 138 may have turning features 147 to turn the cooling air, which increases the amount of time the cooling air has to interact with the back side of the BOAS 106. The flow guide 138 may provide a load path for the BOAS 106 to react to the BOAS support structure 114. In some examples, the flow guide 138 includes a feature 149 on the radially outer side for blade out protection. In one example, the feature 149 is a blade out post, which is used to transfer energy to the BOAS support structure 114 in a blade out event. In another example, the feature 149 may be designed to crumple as the result of a blade out event. This approach may be more weight efficient than the blade out post approach.

Figure 5A:
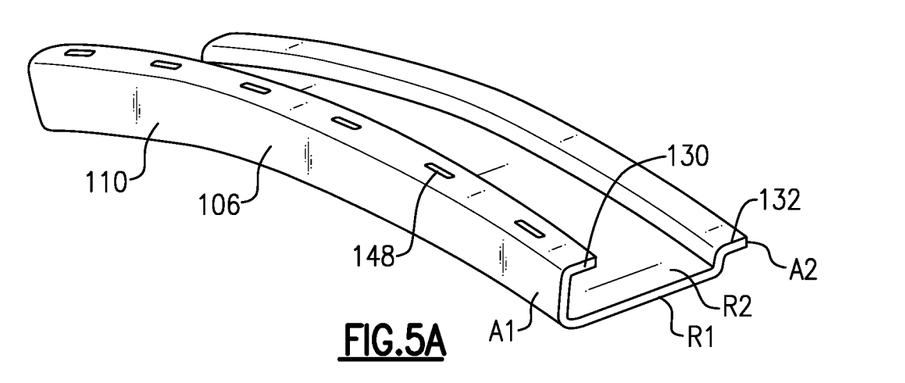
FIG. 5A shows a blade outer air seal.
Figure 5B:
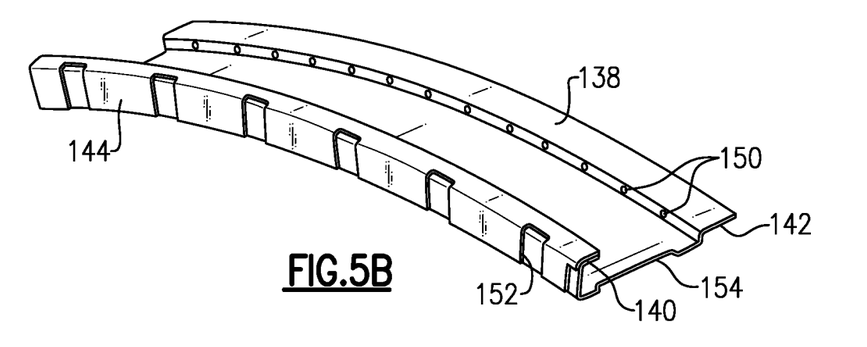
FIG. 5B shows a flow guide.
Figure 5C:
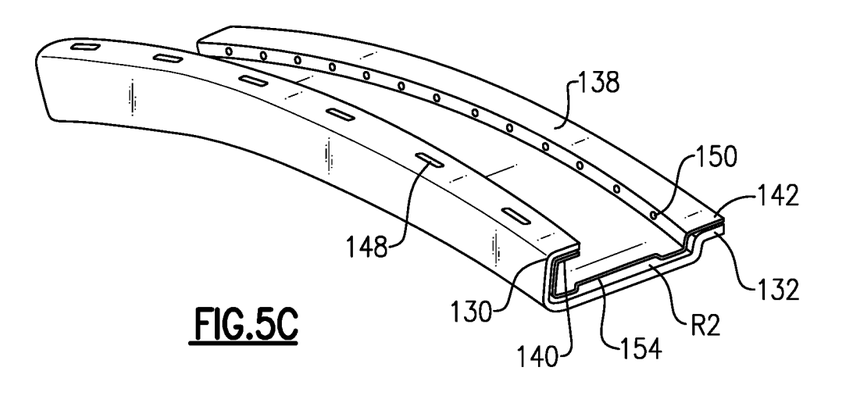
FIG. 5C shows a blade outer air seal and flow guide.

FIGS. 5A-5C show details of the flow guide 138 and BOAS 106. FIG. 5A illustrates a seal segment 110 of the BOAS 106. The BOAS 106 has a plurality of inlets 148 spaced circumferentially along a radially outermost surface of the BOAS 106. The inlets 148 are near a first axial side A1 for the cooling air to flow downstream towards the second axial side A2.

FIG. 5B shows the flow guide 138 and spacer 144. The flow guide 138 has a plurality of outlets 150 spaced circumferentially for cooling air to pass through. The spacer 144 is arranged along an axially forward side of the flow guide 138. The spacer 144 has a plurality of channels 152 for cooling air to travel radially inward from the BOAS inlet 148 to the gap 146 (shown in FIG. 4). The flow guide 138 and spacer 144 may be separate pieces or may be a single piece. In one example, the spacer 144 is stamped, coined, or machined into the flow guide 138. In one embodiment, the spacer 144 may have a notch 154 at the circumferential ends for an intersegment seal.

The flow guide 138 may be a metallic or ceramic matric composite. In one example, the flow guide 138 is a cobalt based alloy that is compatible with ceramic matric composite materials. In another example, the flow guide 138 may be a material that is not compatible with ceramic matrix composite materials, and have a compatible material coating. For example, the flow guide 138 may have a cobalt wear liner. The flow guide 138 may be formed from sheet metal. The flow guide 138 may be formed from a different material from the blade outer air seal 106. The flow guide 138 may have a uniform thickness. The flow guide 138 helps shield the BOAS support 114 from the heat radiating from the BOAS 106 during engine operation. The flow guide 138 may either route cooling air to be dumped from the BOAS 106 or to be reused to cool other parts, such as an adjacent vane 104.

FIG. 5C shows the BOAS 106 and flow guide 138. The channels 150 on the spacer 144 generally align with the inlets 148 on the BOAS to permit cooling air to travel to the radial surface R2 of the BOAS for convection cooling. The channels 150 and inlets 148 may be spaced to optimize cooling air distribution before the cooling air passes along the backside of the BOAS 106. In the illustrated embodiment, the flow guide 138 is segmented. The segments may line up with the seal segments 110 around the circumferential BOAS 106.

Figure 5D:
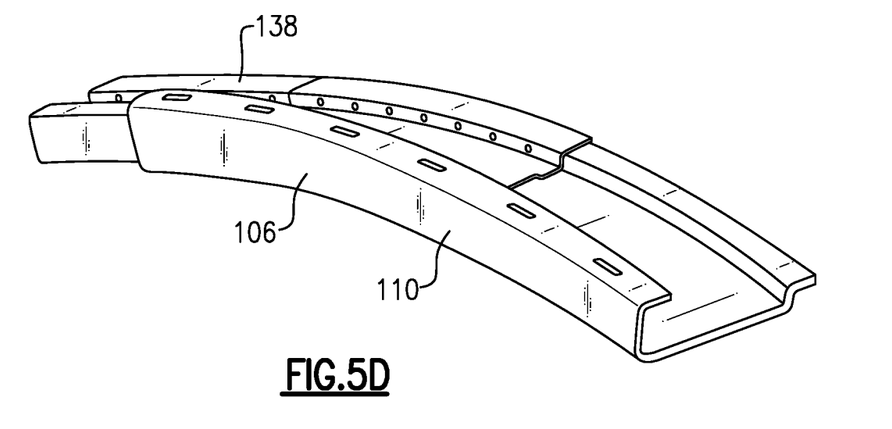
FIG. 5D shows a blade outer air seal and flow guide.

FIG. 5D shows another embodiment of the BOAS 106 and flow guide 138. In this example, segments of the flow guide 138 are offset from the seal segments 110. The flow guide 138 may have the same number of segments as the BOAS 106, or may have a different number of segments. In some examples, the flow guide 138 has a number of segments that is a multiple of the number of BOAS seal segments 110.

In this disclosure, "generally axially" means a direction having a vector component in the axial direction that is greater than a vector component in the radial direction and "generally radially" means a direction having a vector component in the radial direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
   a support structure arranged about an axis;
   at least one blade outer air seal segment mounted in the support structure; and
   a flow guide arranged between the support structure and the at least one blade outer air seal segment defining a passage between the flow guide and the blade outer air seal segment, the passage extending in a generally axial direction.

2. The blade outer air seal assembly of claim 1, wherein the at least one blade outer air seal segment has a hook near a first axial side and a lip near a second axial side for engagement with the support structure, and the flow guide has a flow guide hook and flow guide lip that engage with the at least one blade outer air seal segment.

3. The blade outer air seal assembly of claim 2, wherein the flow guide hook is a radially outermost portion of the flow guide.

4. The blade outer air seal assembly of claim 2, wherein the blade outer air seal has an air inlet in the hook and the flow guide has an air outlet near the second axial side of the blade outer air seal.

5. The blade outer air seal assembly of claim 1, wherein a spacer is positioned between the flow guide and the blade outer air seal to maintain a gap between the flow guide and the blade outer air seal.

6. The blade outer air seal assembly of claim 1, wherein an inlet passage extends through the spacer into the passage.

7. The blade outer air seal assembly of claim 6, wherein an inlet extends through the at least one blade outer air seal segment, the inlet circumferentially aligned with the inlet passage.

8. The blade outer air seal assembly of claim 1, wherein a plurality of blade outer air seal segments are mounted in the support structure circumferentially about the axis.

9. The blade outer air seal assembly of claim 8, wherein the flow guide has a plurality of segments extending circumferentially about the axis.

10. The blade outer air seal assembly of claim 1, wherein the at least one blade outer air seal segment is a ceramic matrix composite material.

11. The blade outer air seal assembly of claim 1, wherein the flow guide is formed from sheet metal.

12. The blade outer air seal assembly of claim 1, wherein the flow guide is a cobalt alloy.

13. A turbine section for a gas turbine engine, comprising:
    a turbine blade extending radially outwardly to a radially outer tip and for rotation about an axis of rotation;
    a blade outer air seal mounted in a support structure and arranged radially outward of the outer tip; and
    a flow guide arranged between the support structure and the blade outer air seal, defining a passage between the flow guide and the blade outer air seal, the passage extending in a generally axial direction from an inlet near a first axial side towards a second axial side.

14. The turbine section of claim 13, wherein a spacer is positioned between the flow guide and the blade outer air seal to maintain a gap between the flow guide and the blade outer air seal.

15. The turbine section of claim 14, where wherein an inlet passage extends through the spacer to the inlet of the passage.

16. The turbine section of claim 15, wherein the inlet is circumferentially aligned with the inlet passage.

17. The turbine section of claim 13, wherein the flow guide has a blade out protection feature extending radially outward from the flow guide.

18. The turbine section of claim 13, wherein a cooling air port extends through a wall of the support structure.

19. The turbine section of claim 13, wherein the blade outer air seal is a ceramic matrix composite material.

20. The turbine section of claim 19, wherein the flow guide is formed from sheet metal.

\* \* \* \* \*